United States Patent
Seier Christensen et al.

(10) Patent No.: US 6,689,294 B1
(45) Date of Patent: Feb. 10, 2004

(54) PROCESS FOR AUTOTHERMAL REFORMING OF A HYDROCARBON FEEDSTOCK

(75) Inventors: Peter Seier Christensen, Copenhagen (DK); Thomas Sandahl Christensen, Lyngby (DK); Ivar Ivarsen Primdahl, Copenhagen (DK); Jens-Henrik Bak Hansen, Lyngby (DK)

(73) Assignee: Haldor Topsøe A/S, Lyngby (DK)

( * ) Notice: Subject to any disclaimer, the term of this patent is extended or adjusted under 35 U.S.C. 154(b) by 0 days.

(21) Appl. No.: 09/720,652

(22) PCT Filed: Jul. 1, 1999

(86) PCT No.: PCT/EP99/04561

§ 371 (c)(1),
(2), (4) Date: Mar. 12, 2001

(87) PCT Pub. No.: WO00/01613

PCT Pub. Date: Jan. 13, 2000

(30) Foreign Application Priority Data

Jul. 2, 1998 (DK) ......................................... 1998 00897

(51) Int. Cl.[7] .......................... C01B 31/18; C01B 3/24; C01B 3/26

(52) U.S. Cl. ................... 252/373; 423/418.1; 423/650; 423/652

(58) Field of Search ................................ 423/648.1, 650, 423/651, 652, 653, 654, 418.1; 252/373

(56) References Cited

U.S. PATENT DOCUMENTS

| | | | |
|---|---|---|---|
| 4,666,680 A | | 5/1987 | Lewis |
| 4,822,521 A | * | 4/1989 | Fuderer ...................... 423/652 |
| 5,358,696 A | | 10/1994 | Jahnke |
| 5,368,835 A | * | 11/1994 | Choudhary et al. ......... 423/651 |
| 5,496,170 A | * | 3/1996 | Primdahl et al. ........... 431/187 |
| 6,123,873 A | * | 9/2000 | Primdahl .................... 252/373 |

FOREIGN PATENT DOCUMENTS

EP 0 307 843 3/1989

* cited by examiner

Primary Examiner—Wayne A. Langel
(74) Attorney, Agent, or Firm—Armstrong, Kratz, Quintos, Hanson & Brooks, LLP

(57) ABSTRACT

Process for the preparation of a hydrogen and/or carbon-monoxide rich gas comprising the step of partial oxidation of a hydrocarbon feedstock with an oxygen containing reactant stream in presence of steam, wherein the steam is present in the hydrocarbon feedstock in an amount higher than in the oxygen containing reactant stream.

3 Claims, No Drawings

PROCESS FOR AUTOTHERMAL REFORMING OF A HYDROCARBON FEEDSTOCK

The present invention is directed to soot free autothermal reforming (ATR) of hydrocarbon feed.

In autothermal reforming, combustion of hydrocarbon feed is carried out with substoichiometric amounts of oxygen by flame reactions in a burner combustion zone and, subsequently, steam reforming of the partially combusted feedstock in a fixed bed of steam reforming catalyst. Substoichiometric combustion of hydrocarbons leads disadvantageously to formation of soot. Soot formation may be avoided by using a specific burner design and through controlling the operating conditions of the ATR process. Soot is formed in the flame of an autothermal reactor within certain ranges of operating conditions. When the amount of steam relative to the other components passed to the ATR reaction is under a certain critical value, soot is formed in the reacting feed. The limiting amount of steam can be expressed as the critical steam to carbon ratio, calculated as the molar flow rate of steam to the molar flow rate of carbon in the hydrocarbon feed. The hydrocarbon feedstock can be in form of natural gas or another kind of hydrocarbon including LPG, butane, naphtha, etc. The molar flow rate of carbon is calculated as the molar flow rate of the hydrocarbon times the carbon content of the hydrocarbon. The design of the burner nozzles has influence on the critical steam to carbon ratio. One such burner useful in ATR is described in U.S. Pat. No. 5,496,170.

Examples of operating conditions, which do not result in soot formation, are summarized in a paper by Christensen and Primdahl (Hydrocarbon processing, March 1994, pages 39–46). The conditions disclosed in this paper are shown in Table 1. Due to heat loss from the relatively small pilot unit employed in the experiments of Christensen and Primdahl to the adiabatic ATR exit temperature will be higher than the temperature given in Table 1. This means that if a large unit, from which the heat loss is negligible, is subjected to the exact same conditions, the ATR exit temperature will be close to the adiabatic ATR exit temperature.

Advantageously, the process is operated at low steam to carbon ratios, since a low ratio lowers the investment expenses for an ATR plant and reduces the necessary energy consumption in operating the plant. Additionally, a low steam to carbon ratio makes it possible to optimise the produced synthesis gas composition for production of CO-rich gases for e.g. methanol or dimethyl ether synthesis and Fisher-Tropsh processes.

The feed to the ATR is divided into two separate streams, which are send to the burner. One stream contains oxygen and steam. The other stream contains hydrocarbon and steam and optionally hydrogen and/or carbondioxide. The two streams are mixed downstream the burner and combustion takes place.

It has now been found that the critical steam to carbon ratio depends on the distribution of steam to the oxygen and hydrocarbon feed stream. When the amount of steam contained in the oxygen feed stream is reduced the critical steam to carbon ratio is reduced.

DESCRIPTION OF THE INVENTION

Based on the above findings, this invention provides a process for the preparation of a hydrogen and/or carbonmonoxide rich gas comprising the step of partial oxidation of a hydrocarbon feedstock with an oxygen containing reactant stream in presence of steam, wherein the steam is present in the hydrocarbon feedstock in an amount higher than in the oxygen containing reactant stream.

The invention allows operation of the process at a lower steam to carbon ratio compared to the critical steam/carbon ratio at equal distribution of steam between the oxygen and the hydrocarbon containing streams. The distance to the critical steam to carbon ratio is thereby by the invention reduced and the risk of soot formation in case of a change in operating conditions e.g. in case of an upset in the feed supply.

Below is the inventive process illustrated at a steam content in the oxygen containing stream down to an amount of 5%, but the process will be applicable also at lower steam concentrations.

EXAMPLE

The test unit employed consists of a system for providing the feeds to the ATR reactor, the ATR reactor itself, and equipment for post treatment of the product gas.

The feed streams consist of natural gas, steam, oxygen, and hydrogen. All gases are compressed to operating pressure and preheated to operating temperature. Natural gas is desulphurized before entering the ATR reactor. The feeds were combined into two streams and were send to the burner of the ATR. A first feed stream of natural gas, hydrogen, and steam was heated to 500° C. A second feed stream containing oxygen and steam was heated to 220° C.

In the ATR reactor, the substoichiometric combustion and a subsequent catalytic steam reforming and shift reactions were carried out. The inlet and exit gas compositions are analyzed by gaschromatography. The product gas was in equilibrium with respect to the reforming and shift reactions.

Downstream the ATR reactor, the process gas was cooled down and the majority of the steam content of the product gas condensed. Any soot formed during the above reaction will be captured in the condensate. The condensate was subjected to both gravimetric and spectrophotometric analyse.

The following tests were carried out to illustrate the influence of steam distribution on the critical steam to carbon ratios according to the invention. The hydrocarbon used was natural gas. The composition of the natural gas is summarized in Table 2.

TABLE 2

| Composition of Natural Gas | |
|---|---|
| Component | Mole Fraction % |
| $N_2$ | 0.45 |
| $CO_2$ | 1.20 |
| $CH_4$ | 95.36 |
| $C_2$ | 2.22 |
| $C_3$ | 0.45 |
| $C_4$ | 0.23 |
| $C_5^+$ | 0.08 |

Each test was made by approaching the critical steam to carbon ratio from the steam rich side. The tests were initiated with a sufficiently high steam flow to ensure soot free conditions. The steam flow was then decreased stepwise to a steam to carbon ratio of approximately 0.03. The system was allowed to become stable after which the condensate was examined for soot content. If the condensate was still soot free, the next step was taken. The term "soot free conditions" refers to condition in which the soot formation is negligible. The soot amount formed at the critical steam to carbon ratio was approximately 3–5 ppm.

Table 3 shows the critical steam to carbon ratio at two different temperature levels and at varying steam distribution. The flow rates were in all below described tests 100 Nm³/hr natural gas and 3 Nm³/h hydrogen. 100 Nm³/h natural gas correspond to a carbon flow rate of 103 Nm³/h. The oxygen flow rate was adjusted to obtain the desired berating temperature and varied in the range 58–61 Nm³/h.

Due to heat loss from the relatively small pilot unit the adiabatic ATR exit temperature will be higher than the temperature given in Table 3. This means that if a large unit, from which the heat loss is negligible, is subjected to exact the same conditions, the ATR exit temperature will be close go the adiabatic ATR exit temperature.

TABLE 3

Critical Steam to Carbon Ratio as Function of Steam Distribution and Temperature. Pressure is 24.5 bar

| Test No. | $O_2$/C | Steam flow oxygen containing feed stream Nm₃/h | Steam concentration in oxygen containing feed mole % | Steam flow natural gas containing feed stream Nm₃/h | Sritical S/C | Gas Temperature at ATR Exit ° C. | Adiabatic ex T |
|---|---|---|---|---|---|---|---|
| 1.1 | 0.59 | 25 | 29 | 67 | 0.89 | 970 | 1032 |
| 1.2 | 0.57 | 8 | 12 | 61 | 0.67 | 971 | 1024 |
| 1.3 | | 3 | 5 | 61 | 0.62 | (971) | |
| 2.1 | 0.59 | 18 | approx ta 24 | 22 | 0.39 | 1032 | 1105 |
| 2.2 | 0.58 | 4 | 6 | 31 | 0.34 | 1030 | 1102 |

The composition of the product gas from the ATR reactor in the tests of Table 3 was measured by gaschromatography. Selected gas compositions are shown in Table 4. The gas composition is given as dry mole %, which is the mole composition of the gas components when steam is not included.

TABLE 4

Composition of Product Gas (dry Mole %) of the Tests of Table 3

| Test Number | $H_2$ % | $N_2$ % | CO % | $CO_2$ % | $CH_4$ % |
|---|---|---|---|---|---|
| 1.1 | 64.6 | 0.3 | 25.8 | 7.9 | 1.4 |
| 1.2 | 64.2 | 0.3 | 27.0 | 6.5 | 2.0 |
| 2.1 | 64.1 | 0.2 | 29.9 | 4.7 | 1.1 |
| 2.2 | 63.4 | 0.2 | 30.7 | 4.3 | 1.4 |

The data in Table 3 clearly demonstrate the influence of the steam distribution on the critical steam to carbon ratio. The critical steam to carbon ratio is 44% higher in test number 1.1 than in test number 1.3. The steam concentration in the oxygen containing feed stream is 29% in test 1.1 and 500 in test 1.3. A similar but less pronounced influence is seen at higher temperature. The critical steam to carbon ratio is 15% higher in test number 2.1 than in test number 2.2, where the steam concentrations are 24% and 6% respectively in the oxygen containing stream.

What is claimed is:

1. Process for the preparation of a hydrogen and/or carbon monoxide rich gas in an autothermal reformer by partial oxidation of a hydrocarbon feedstock with an oxygen containing reactant stream in presence of steam, the process comprising:

providing two streams to a burner arranged at the top of the autothermal reformer, a first stream containing oxygen and steam and a second stream containing hydrocarbon and steam, mixing the two streams downstream of the burner to form a mixed stream, and partially oxidizing the mixed stream with substoichiometric amounts of oxygen by flame reactions, wherein the steam content of the oxygen containing first stream is less than 12% and the steam content of the hydrocarbon containing second steam is present in an amount higher than in the oxygen containing first stream.

2. Process according to claim 1, wherein less than ⅓ of the total steam feed is introduced with the oxygen containing stream.

3. Process according to claim 1, wherein the steam to carbon ratio in the mixed stream is below 0.9 at an adiabatic process exit temperature of between 1000° to 1150° C.

* * * * *